United States Patent
Takano

(10) Patent No.: US 9,183,471 B2
(45) Date of Patent: Nov. 10, 2015

(54) IMAGE PROCESSING DEVICE FOR A CONTINUOUS RECORDING MEDIUM, IMAGE FORMING DEVICE AND NON-TRANSITORY COMPUTER READABLE MEDIUM FOR THE SAME

(71) Applicant: FUJI XEROX CO., LTD., Tokyo (JP)

(72) Inventor: Yukitoshi Takano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/217,735

(22) Filed: Mar. 18, 2014

(65) Prior Publication Data
US 2015/0043014 A1   Feb. 12, 2015

(30) Foreign Application Priority Data
Aug. 9, 2013  (JP) ................................ 2013-166376

(51) Int. Cl.
- G06F 3/12 (2006.01)
- G06K 15/16 (2006.01)
- B41J 11/00 (2006.01)

(52) U.S. Cl.
CPC ............. G06K 15/16 (2013.01); B41J 11/008 (2013.01); B41J 11/0095 (2013.01)

(58) Field of Classification Search
USPC .......................... 358/1.15; 715/518, 525, 527
See application file for complete search history.

(56) References Cited

U.S. PATENT DOCUMENTS

2005/0044550 A1 *  2/2005  Perdu .......................... 718/105
2006/0150093 A1 *  7/2006  Chen ........................... 715/518

FOREIGN PATENT DOCUMENTS

| JP | 62-080082 | 4/1987 |
| JP | H03-129374 | 6/1991 |
| JP | H04-151274 | 5/1992 |
| JP | 2005-231062 | 9/2005 |
| JP | 2008-126516 | 6/2008 |
| JP | 2009-179048 | 8/2009 |

OTHER PUBLICATIONS

Abstract and machine translation of JP 2009-179048.
Abstract and machine translation of JP 2008-126516.
Office Action dated Aug. 12, 2014 in Japanese Patent Application No. 2013-166376 and English translation.
English Language Abstract of JP 2009-179048.
English Language Abstract of JP S62-080082.
English Language Abstract of JP H03-129374.
English Language Abstract of JP H04-151274.
English Language Abstract of JP 2005-231062.
Office Action dated Dec. 9, 2014 in Japanese Patent Application No. 2013-166376 and English translation.

* cited by examiner

Primary Examiner — Martin Mushambo
(74) Attorney, Agent, or Firm — Fildes & Outland, P.C.

(57) ABSTRACT

An image processing device, includes: an output unit that outputs a reference signal for every page break when a continuous recording medium is conveyed; and a control unit that controls an image forming unit which forms an image on the recording medium with a resolution which is different from a resolution in conveyance of the recording medium so as to adjust an image forming position onto the recording medium for every page based on the reference signal.

7 Claims, 5 Drawing Sheets

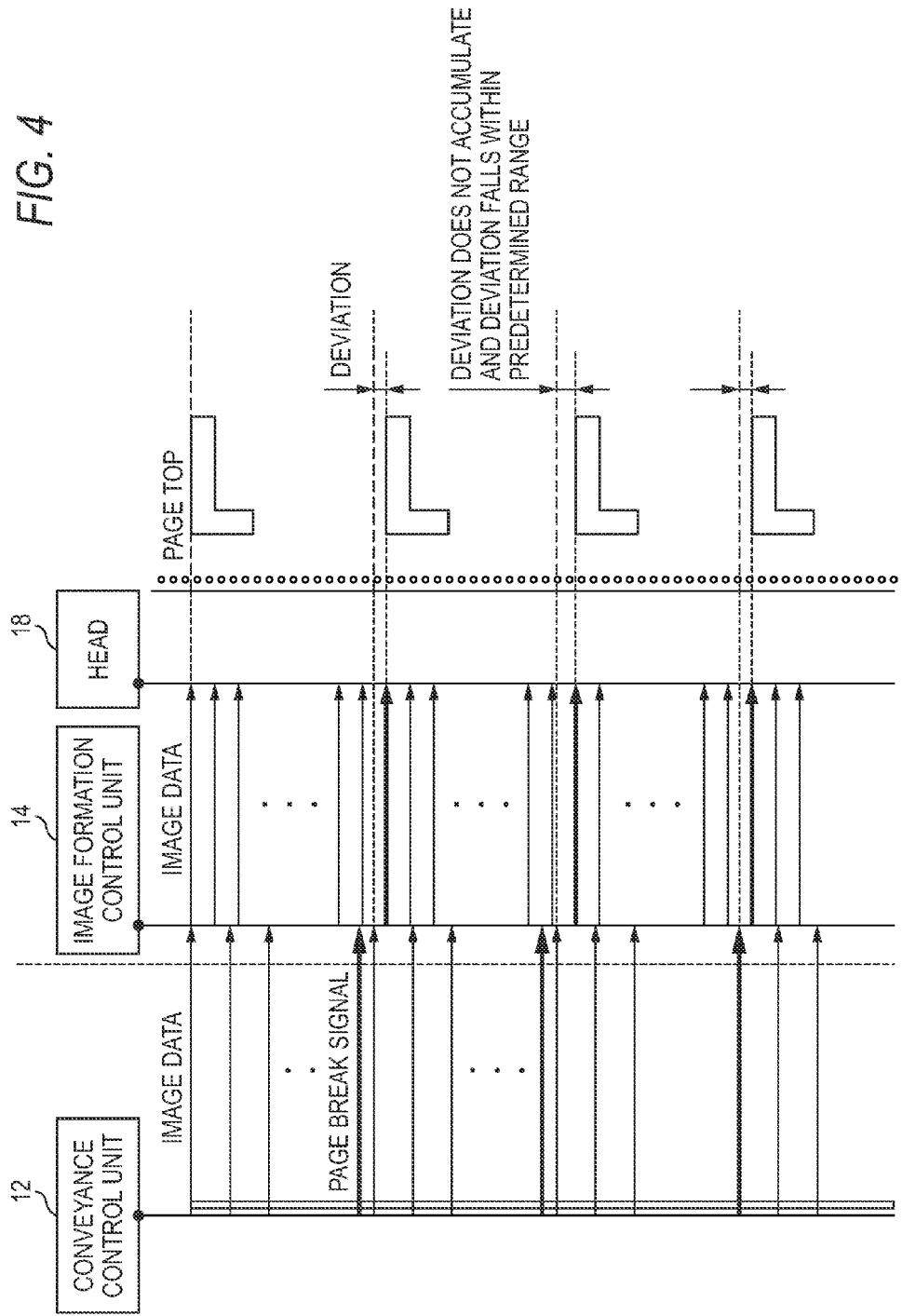

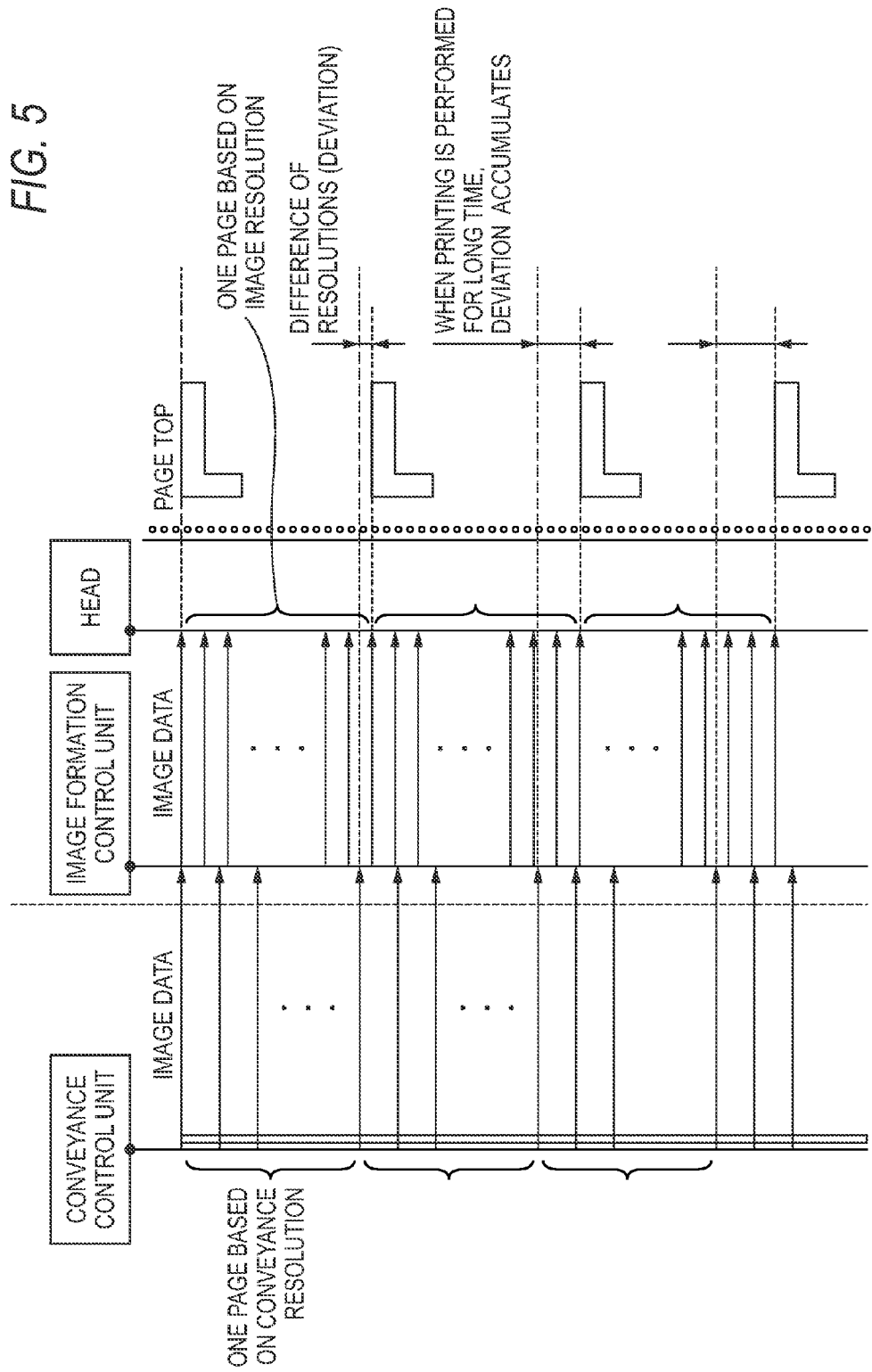

IMAGE PROCESSING DEVICE FOR A CONTINUOUS RECORDING MEDIUM, IMAGE FORMING DEVICE AND NON-TRANSITORY COMPUTER READABLE MEDIUM FOR THE SAME

CROSS-REFERENCE TO RELATED APPLICATIONS

This application is based on and claims priority under 35 U.S.C. 119 from Japanese Patent Application No. 2013-166376 filed on Aug. 9, 2013.

BACKGROUND

1. Technical Field

The present invention relates to an image processing device, an image forming device, and a non-transitory computer readable medium.

2. Related Art

In an image forming device which forms an image on a continuous recording medium, a deviation may occur due to a conveyance error of the recording medium so that a technology for performing various corrections has been suggested.

SUMMARY

According to an aspect of the present invention, an image processing device, includes: an output unit that outputs a reference signal for every page break when a continuous recording medium is conveyed; and a control unit that controls an image forming unit which forms an image on the recording medium with a resolution which is different from a resolution in conveyance of the recording medium so as to adjust an image forming position onto the recording medium for every page based on the reference signal.

BRIEF DESCRIPTION OF THE DRAWINGS

Exemplary embodiment(s) of the present invention will be described in detail based on the following figures, wherein

FIG. 4 is a view illustrating adjustment of an image forming position based on a page break signal in the image forming device according to the embodiment; and FIG. 5 is a diagram illustrating a deviation of an image forming position which is caused when a difference of resolutions between an image formation control unit and a conveyance control unit accumulates.

DETAILED DESCRIPTION

Figure 1:
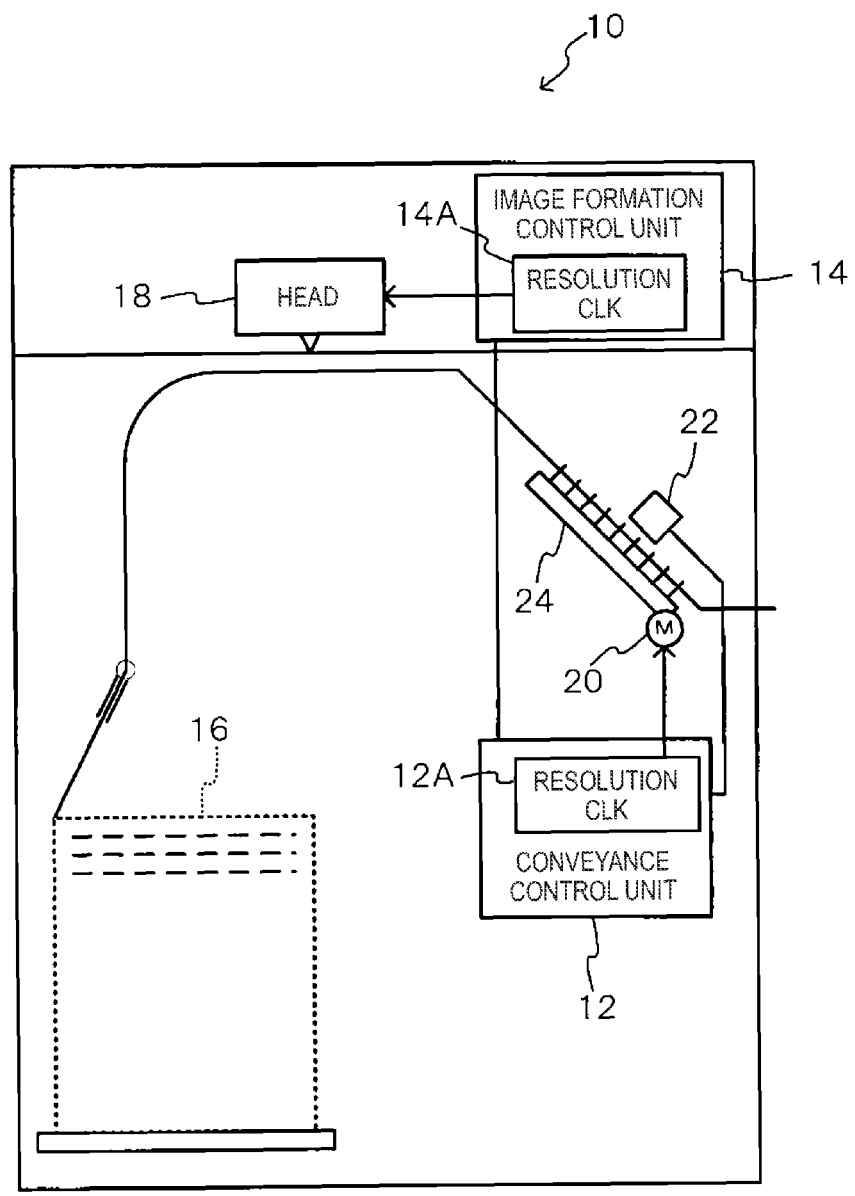
FIG. 1 is a diagram illustrating a schematic configuration of an image forming device according to an embodiment of the present invention.

Hereinafter, exemplary embodiments of the present invention will be described with reference to the drawings. FIG. 1 is a diagram illustrating a schematic configuration of an image forming device 10 according to an embodiment of the present invention.

The image forming device 10 according to the embodiment of the present invention forms an image on a continuous sheet (hereinafter, referred to as a continuous paper) as a recording medium.

The continuous paper is accommodated in an accommodating unit 16, conveyed to a head 18 which forms an image along a predetermined conveyance path and discharged from the image forming device 10 after an image is formed by the head 18.

A tractor 24 in which a plurality of pins which is inserted into holes provided in the continuous paper is provided is installed in the conveyance path and the continuous paper is conveyed while being held by the tractor 24. The tractor 24 is driven by a motor 20. That is, when the motor 20 is driven, the tractor 24 is moved and the continuous paper which is held by the tractor 24 is conveyed. In the embodiment, the driving of the motor 20 is controlled by the conveyance control unit 12 based on a clock signal generated by a resolution CLK (clock) 12A. The clock signal generated by the resolution CLK 12A relates to a resolution of in conveyance of the continuous paper which is a motion unit in sheet conveyance by the conveyance control unit 12.

The head 18 which is provided on the conveyance path forms an image while conveying the continuous paper.

In the embodiment, the head 18 forms an image in a main scanning direction (a direction which is perpendicular to the conveyance direction of the continuous paper) and conveys the continuous paper to perform sub scanning.

The head 18 is controlled by the image formation control unit 14. In the embodiment, the driving of the head 18 is controlled by the image formation control unit 14 based on a clock signal generated by a resolution CLK 14A which is independent from the resolution CLK 12A of the conveyance control unit 12.

In the embodiment, a sensor 22 which detects a continuous paper which is on the conveyance path and detects a leading edge of the continuous paper is provided. The detection result of the sensor 22 is output to the conveyance control unit 12.

The conveyance control unit 12 detects every page break of the continuous paper based on a driven amount of the motor 20 using a position where the leading edge of the continuous paper is detected by the sensor 22 as a reference, to generate a page break signal. Specifically, when the conveyance control unit 12 drives the motor 20, the conveyance control unit 12 generates the page break signal at the time when the motor is driven by a driven amount corresponding to a conveyed amount which is determined in advance based on a page length using a position where the leading edge of the continuous paper is detected by the sensor 22 as a reference. A distance between the sensor 22 and the head 18 may be considered to determine the conveyed amount.

However, as in the image forming device 10 according to the embodiment, when an image is formed on the continuous paper, the sheet is continuously conveyed and image data is also continuously sent. Therefore, different from an image forming device which forms an image of every page on a separate sheet, the image forming position for every page can not be corrected by only detecting a leading edge of the continuous sheet. If a resolution of the conveyance control unit does not match a resolution of the image formation control unit, a difference of the resolutions accumulates. Therefore, when a large amount of images are formed on the continuous paper, a deviation may finally occur in an image forming position on the continuous paper.

Therefore, in the related art, the conveyance control unit and the image formation control unit are operated at the same resolution to remove an error so that the deviation of the image forming position due to the accumulated difference of the resolutions is prevented.

To the contrary, in recent years, like the image forming device 10 according to the embodiment, the image formation control unit 14 itself has a resolution which is favorable to a configuration, that is, a higher resolution in order to independently perform image processing or image correction. As described in the embodiment, in the image forming device which has the image formation control unit 14 and the conveyance control unit 12 which are controlled at independent resolutions, if the resolutions of the image formation control unit 14 and the conveyance control unit 12 are different, as illustrated in FIG. 5, the difference of the resolutions accumulates, which may cause large deviation of the image forming position.

Therefore, in the embodiment, the conveyance control unit 12 detects a leading edge of the continuous paper using the sensor 22 and detects a page break position of the continuous paper from a driven amount of the motor 20 based on the detected position of the leading edge to output the detection result (page break signal) to the image formation control unit 14. Further, the image formation control unit 14 controls the head 18 to adjust at least one of image forming positions including an image formation starting position and an image formation ending position based on the page break signal which is output from the conveyance control unit 12.

Specifically, when the image formation control unit 14 receives the page break signal while the image data is transmitted to the head 18, image data of subsequent raster is deleted and image data of a next page starts to be transmitted to the head 18. In the meantime, blank data is continuously transmitted to the head 18 until the image formation control unit 14 transmits all stored image data to the head 18 to receive the page break signal.

If timing when the page break signal is generated exceeds a predetermined expected timing by a predetermined range, it is determined as a synchronization error so that transmission of the image data is stopped to stop the image forming operation.

Therefore, a difference of the resolutions which is generated at the page break position is not accumulated, so that an image forming position is always stably maintained even when a large amount of images are formed.

Continuously, specific processing which is performed in the image forming device 10 configured as described above will be described.

Figure 2:
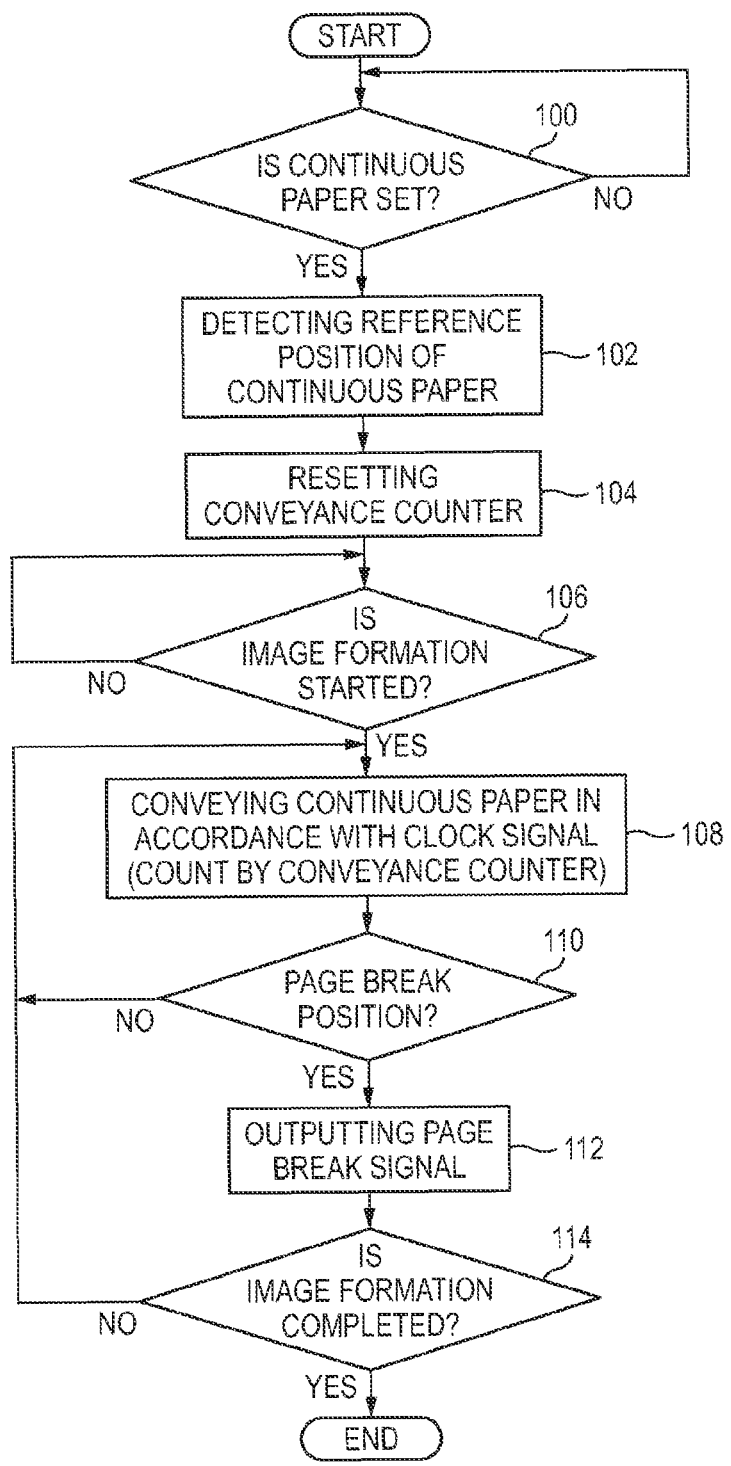
FIG. 2 is a flow chart illustrating an example of a specific processing flow which is performed in a conveyance control unit of the image forming device according to the embodiment.

First, specific processing which is performed in the conveyance control unit 12 will be described. FIG. 2 is a flow chart illustrating an example of a specific processing flow which is performed in the conveyance control unit 12 of the image forming device 10 according to the embodiment.

At step 100, it is determined whether the continuous paper is set in the image forming device 10. In this determination, it is detected whether the sensor 22 detects the continuous paper and if this determination result is "YES", the process goes to step 102 and if this determination result is "NO", the process waits until the determination result is "YES" and then goes to step 102.

At step 102, when the continuous paper is set, a reference position of the continuous paper is detected by the sensor 22 and the process goes to step 104. That is, in the embodiment, the leading edge when the continuous paper is set in the image forming device 10 is detected by the sensor 22 as a reference position. In the embodiment, the continuous paper is conveyed based on the leading edge to count the clock signal generated by the resolution CLK 12A as a conveyance amount to detect a page break position.

At step 104, a conveyance counter which detects a page break is reset and the process goes to step 106.

At step 106, it is determined whether image formation is started. In this determination, it is determined whether the image formation is instructed and the process waits until the determination result is "YES" and then goes to step 108.

At step 108, the continuous paper is conveyed in accordance with the clock signal which is generated by the resolution CLK 12A and the process goes to step 110. Further, in this case, the clock signal which is generated at the resolution CLK 12A is counted by the conveyance counter.

At step 110, it is determined whether to be a page break position. In this determination, it is determined whether to be a page break position based on the count result of the clock signal which is generated by the resolution CLK 12A and if the determination result is "NO", the process returns step 108 to convey the continuous paper and if the determination result is "YES", the process goes to step 112. In the embodiment, the clock signal which is generated at the resolution CLK 12A is counted to determine whether to be the page break position. However, the determination of the page break position is not limited thereto and may be performed using another method. For example, a conveyed amount of the continuous paper may be detected by the sensor 22 to detect the page break position or a movement amount of the tractor 24 may be detected by, for example, a rotary encoder to detect the conveyed amount of the continuous paper to detect the page break position.

At step 112, the page break signal is output to the image formation control unit 14 and the process goes to step 114. Therefore, the page break position is adjusted by the image formation control unit 14.

At step 114, it is determined whether the image formation is completed and if this determination result is "NO", the process returns to step 108 to repeat the above-described processing and if the determination result is "YES", a series of processing of the conveyance control unit 12 ends.

Figure 3:
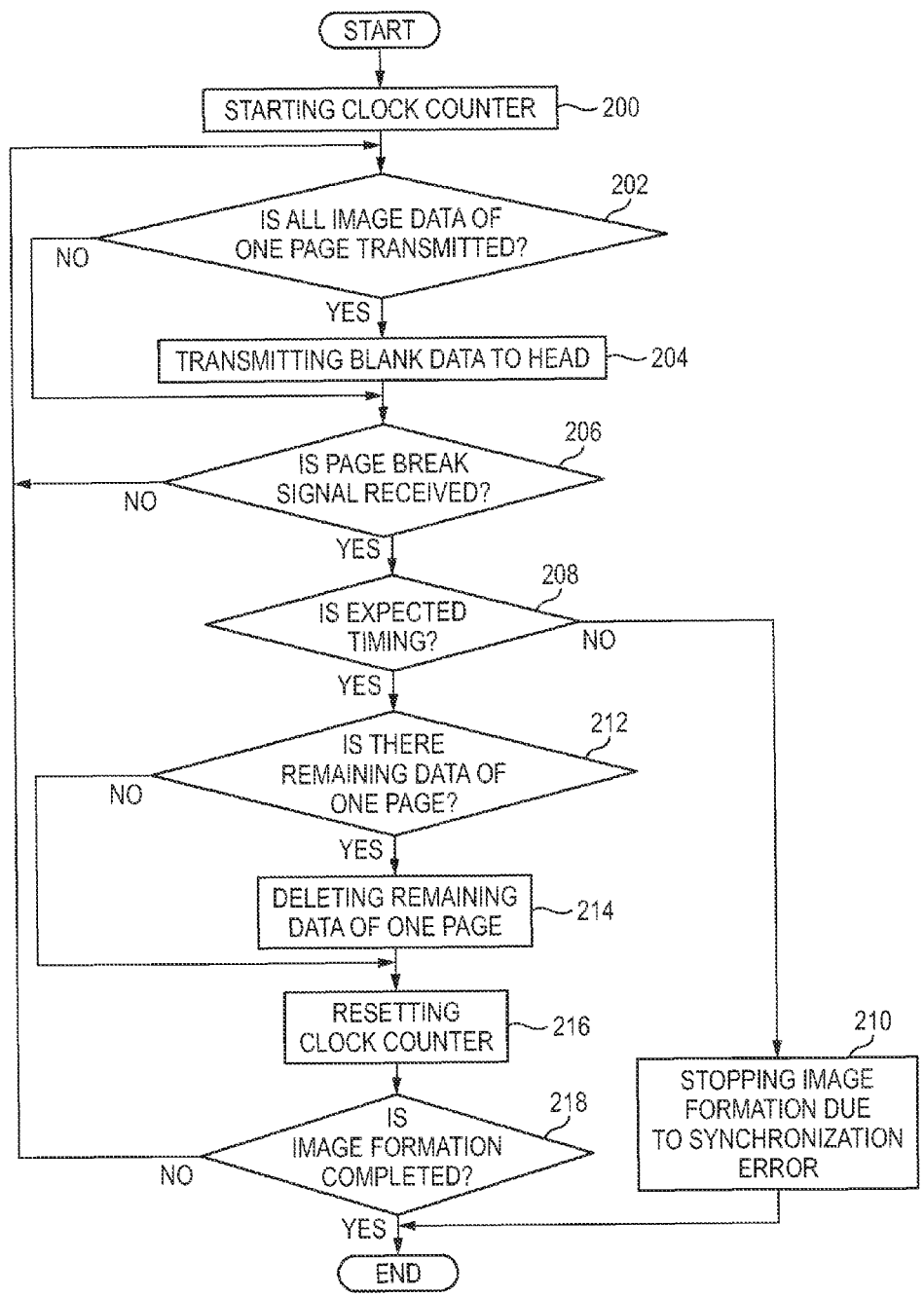
FIG. 3 is a flow chart illustrating an example of a specific processing flow which is performed in an image formation control unit of the image forming device according to the embodiment.

Next, specific processing which is performed in the image formation control unit 14 will be described. FIG. 3 is a flow chart illustrating an example of a specific processing flow which is performed in the image formation control unit 14 of the image forming device 10 according to the embodiment.

At step 200, a clock counter which counts one page using a clock signal which is generated by the resolution CLK 14A starts. The image data of one page is transmitted to the head 18 in accordance with the clock signal which is generated by the resolution CLK 14A to form an image of one page and the process goes to step 202.

At step 202, it is determined whether all image data of one page is transmitted to the head 18. In this determination, it is determined whether the image data is completely transmitted to the head 18 before receiving the page break signal output from the conveyance control unit 12 and if this determination result is "YES", the process goes to step 204 and if this determination result is "NO", the process goes to step 206.

At step 204, the blank data is transmitted to the head 18 and the process goes to step 206. That is, the blank data is transmitted to the head 18 until the page break signal is received from the conveyance control unit 12 so that the image forming position is adjusted. Therefore, the page breaks of the conveyance control unit 12 and the image formation control unit 14 are synchronized.

At step 206, it is determined whether the page break signal is received from the conveyance control unit 12 and if this determination result is "NO", the process returns to step 202 to repeat the above-described processing and if the determination result is "YES", step 208 is also performed.

At step 208, it is determined whether the page break signal is at an expected timing. In this determination, it is determined whether a count value of the clock counter is a value within a range which is determined in advance as one page and if the determination result is "NO", the process goes to step 210 and if the determination result is "YES", the process goes to step 212.

At step 210, the image formation stops due to a synchronization error and a series of processing of the image formation control unit 14 end.

In the meantime, at step 212, it is determined whether data of one page remains, and if the determination result is "YES", the process goes to step 214 and if the determination result is "NO", the process goes to step 216.

At step 214, remaining data of one page is deleted and the process goes to step 216. By doing this, the image forming position is adjusted and the page breaks of the conveyance control unit 12 and the image formation control unit 14 are synchronized.

At step 216, the clock counter is reset. And, the image data of the next page is transmitted to the head 18 in accordance with the clock signal which is generated by the resolution CLK 14A to form an image of the next page, and the process goes to step 218.

At step 218, it is determined whether the image formation is completed and if this determination result is "NO", the process returns to step 202 to repeat the above-described processing and if the determination result is "YES", a series of processing of the image formation control unit 14 ends.

As described above, processing of the conveyance control unit 12 and the image formation control unit 14 are performed so that as illustrated with a heavy arrow line of FIG. 4, the conveyance control unit 12 transmits the page break signal and the image formation control unit 14 adjusts the image forming position based on the page break signal to form an image. Therefore, even when an image is formed on a large amount of continuous papers, the deviation of the image position does not accumulate and falls within a predetermined range.

That is, in the image forming device 10 according to the embodiment, if the conveyance control unit 12 and the image formation control unit 14 have different resolutions, the conveyance control unit 12 and the image formation control unit 14 are not synchronized at a clock based on any one of the resolutions but the image forming position is adjusted in the unit of page. Therefore, the clock does not need to be minutely controlled. As a result, even though the conveyance control unit 12 and the image formation control unit 14 operate at different resolutions, the accumulated deviation due to the difference of the resolutions is simply restricted. Further, even when the continuous paper is continuously conveyed and a large amount of images is formed, the starting position deviation is also prevented.

In the embodiment, the sensor 22 performs detection based on the leading edge of the continuous paper, but the present invention is not limited thereto. If it is a position with which the page break is discernible, another position (e.g., a hole position of the continuous paper from the leading edge) may be detected.

The processing which is performed in the respective control units of the conveyance control unit 12 and the image formation control unit 14 in the embodiment may be stored in a recording medium as a program to be distributed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device, comprising:
   an output unit that outputs a reference signal for every page break when a continuous recording medium is conveyed; and
   a control unit that controls an image forming unit which forms an image on the continuous recording medium with a resolution which is different from a resolution in conveyance of the continuous recording medium so as to adjust an image forming position onto the continuous recording medium for every page based on the reference signal;
   wherein image formation on the continuous recording medium and conveyance of the continuous recording medium are not synchronized at a clock based on any one of the resolutions but the image forming position is adjusted page by page.

2. The image processing device of claim 1, wherein the output unit detects a page break position from a conveyed amount of the continuous recording medium based on a detection result of a detecting unit which detects a leading edge of the continuous recording medium and outputs the reference signal when the page break position is detected.

3. The image processing device of claim 1, wherein when the reference signal is output by the output unit, if an image to be formed in one page remains, the control unit controls the image forming unit to delete the remaining image and form an image of a next page.

4. The image processing device of claim 1, wherein if the image formation for one page is completed before outputting the reference signal by the output unit, the control unit controls the image forming unit to form a blank image until the reference signal is output.

5. The image processing device of claim 1, wherein when an output timing of the reference signal which is output by the output unit is different from an expected timing, the control unit controls the image forming unit to determine that it is an error and to stop the image formation.

6. An image forming device, comprising:
   a conveying unit that conveys the continuous recording medium;
   the image forming unit that forms the image on the continuous recording medium at the resolution which is different from the resolution in conveyance of the continuous recording medium; and
   the image processing device of claim 1.

7. A non-transitory computer readable medium storing a program causing a computer to execute a process for an image processing, the process comprising:
   outputting a reference signal for every page break when a continuous recording medium is conveyed; and
   controlling an image forming unit which forms an image on the continuous recording medium with a resolution which is different from a resolution in conveyance of the continuous recording medium so as to adjust an image forming position onto the continuous recording medium for every page based on the reference signal;

wherein image formation on the continuous recording medium and conveyance of the continuous recording medium are not synchronized at a clock based on any one of the resolutions but the image forming position is adjusted page by page.

\* \* \* \* \*